(No Model.) 2 Sheets—Sheet 1.

J. E. CROSBY.
ASH SIFTER.

No. 383,173. Patented May 22, 1888.

WITNESSES,
Edwin I. Yewell,
Wm. J. Littell,

INVENTOR,
Joseph E. Crosby
by J. R. Littell,
Attorney.

(No Model.) 2 Sheets—Sheet 2.
J. E. CROSBY.
ASH SIFTER.
No. 383,173. Patented May 22, 1888.
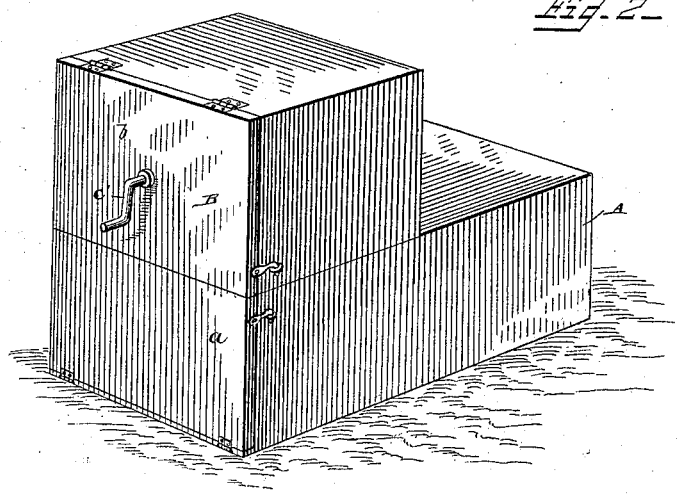
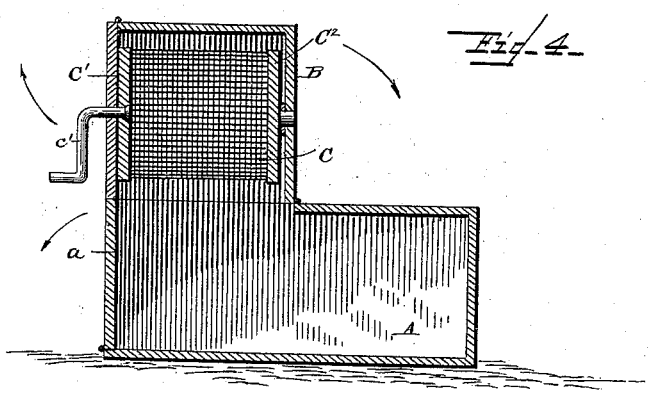
WITNESSES.
Edwin I. Yewell,
Wm. J. Little,
INVENTOR,
Joseph E. Crosby
by J. R. Littell
Attorney.

United States Patent Office.

JOSEPH E. CROSBY, OF WESTFIELD, NEW JERSEY.

ASH-SIFTER.

SPECIFICATION forming part of Letters Patent No. 383,173, dated May 22, 1888.

Application filed September 6, 1887. Serial No. 248,966. (No model.)

*To all whom it may concern:*

Be it known that I, JOSEPH E. CROSBY, a citizen of the United States, residing at Westfield, in the county of Union and State of New Jersey, have invented certain new and useful Improvements in Ash-Sifters; and I do hereby declare that the following is a full, clear, and exact description of the invention, which will enable others skilled in the art to which it appertains to make and use the same.

My invention relates to improvements in ash-sifters; and it consists in certain arrangements of parts and details of construction, as hereinafter fully described and claimed.

Figure 1:
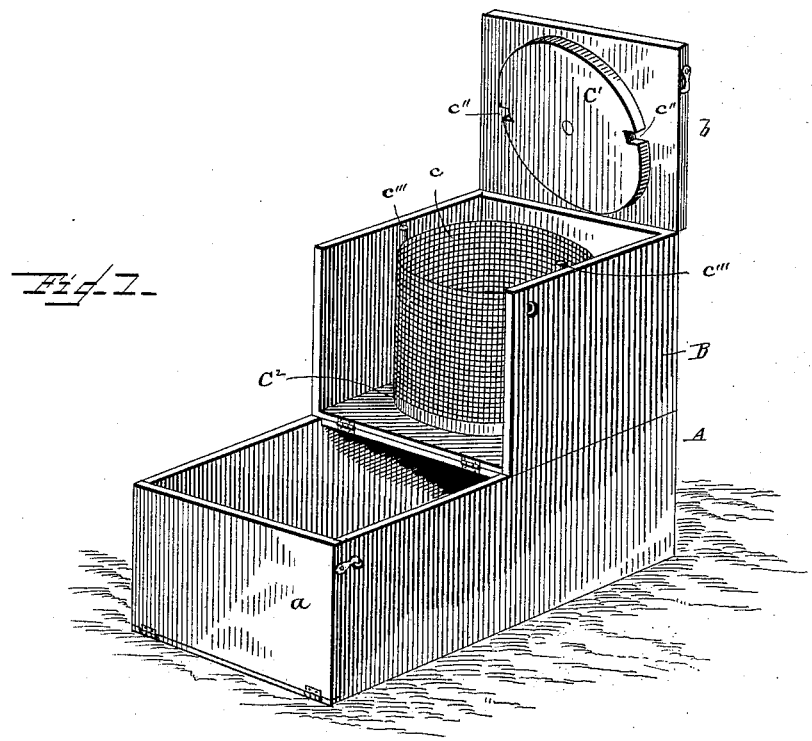
Figure 2:
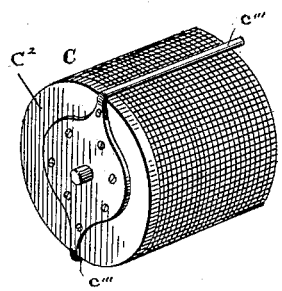
Figure 3:
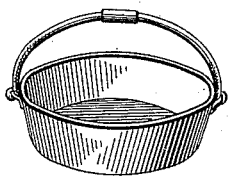

In the drawings hereto annexed and forming a part of this specification, Figure 1 is a perspective view of my improved ash-sifter, showing the same open. Fig. 2 is a perspective view of the same closed and in position for operation. Fig. 3 shows the ash-pan. Fig. 4 is a vertical longitudinal view in section. Fig. 5 is a detail perspective view of the sieve.

The letter A represents an ash box or receptacle, preferably rectangular in shape and of any desired size. The face $a$ of this box is closed by a hinged door secured by a hook and eye, or any suitable fastening, through which access may be had to the interior when desired. The box is elsewhere tightly closed except beneath the sieve-box B. The latter is preferably also rectangular in shape and about half the length of the ash-box, as shown, and is hinged to the top of the box A at a point nearly midway between the ends thereof. By this construction when the sieve-box B is raised on its hinges it rests upon one end on the top of the ash box A, as shown in Fig. 1, whereas when closed its open bottom falls directly over and registers with the opening in the top of the ash-box A, all for a purpose hereinafter set forth.

Within the sieve-box B is located a sieve or sifter, C, of cylindrical shape. The lower end of the sieve C is closed by a disk or head, $C^2$, centrally journaled on a bolt or stub shaft in the lower end of the sieve-box, while the upper end is open, as shown at $c$. The upper end of the sieve-box $b$ is hinged to the top of said box and adapted to swing outwardly, being secured in closed position by hooks and eyes at the side or by other suitable fastening devices.

A rod, $c'$, cranked on its outer end, passes centrally through said end $b$ of the sieve-box and is journaled therein, and secured to the inner end of said rod is a cover, $C'$, for said sieve, preferably circular in shape and of approximately the same diameter as said sieve. Two or more notches, $c''$, are formed in the circumference of the cover $C'$, which, when said cover is closed down upon the open end of said sieve, engage projections $c'''$, extending slightly beyond the open end of said sieve. By this means when the cover $C'$ is rotated by the crank $c'$ a rotary motion is imparted to the sieve C.

Preferably the projections $c'''$ consist of rods secured to the bottom of the sieve, passing along the sides thereof, to which they are attached, and extending slightly above the top or open end, $c$. These rods serve to strengthen and brace the sieve and resist the centrifugal force of the ashes being sifted when the sieve is rotated.

It will be understood that the boxes A and B are constructed of wood, sheet metal, or wood lined with metal.

The operation of my improved ash-sifter is as follows: The ashes to be sifted are brought to the sifter in the ash-pan, Fig. 3, which, as ordinarily constructed, is circular in shape. The sieve-box B is raised on its hinges so as to rest on one end on the ash-box A, and the end $b$ opened, as shown in Fig. 1. The ash-pan is then placed bodily within the sieve C and lowered therein until it rests upon the bottom thereof. The end $b$ is then closed down and hooked in place, by which operation the cover $C'$ is closed upon the open end $c$ of the sieve, as above described. The sieve-box B is then closed down upon the ash-box A, whereby all openings which might permit the escape of dust and fine ashes are closed. The sieve C is then revolved by means of crank $c'$, and the rotary motion of said sieve turns the ashes down out of the ash-pan and sifts them thoroughly, the finer particles falling through the meshes of the sieve into the ash-box A, whence they can be removed at will through the hinged door $a$. When the sieve-box is turned down, bringing the sieve into horizontal position, the ash-pan will of its own volition remain in position against the bottom of said sieve. This operation is secured by the construction shown, in which the rim of the ash-pan is inclined toward the bottom, so that the inclination and tendency of the pan to fall is in that direction, and thus it normally rests against the bottom of the sieve, and is retained in normal position during the rotation of the latter by centrifugal force. After the process of sifting is completed the apparatus is allowed to stand for a few moments in order to permit the dust to settle, when the sieve-box is raised, bringing the sieve to a vertical position, the end $b$ of said sieve-box unhooked and opened, and the ash-pan containing the coal removed.

It will be observed that it is unnecessary to dump the ashes from the ash-pan into the sifter, as in most ash-sifters now in use, and that the sifting takes place entirely within a closed receptacle, whereby the disagreeable results arising therefrom are obviated; also, that when the process of sifting is completed the coal drops back into the ash-pan and may be removed therewith without handling or shoveling it.

Having thus described my invention, what I claim as new, and desire to secure by Letters Patent, is—

1. In an ash-sifter, the combination, with a sieve-box provided with a hinged door and a cylindrical sieve located therein, the bottom of said sieve being pivotally connected with the bottom of said box, and the top of said sieve being open, of a removable top for said sieve, pivotally connected to the hinged door, and means for revolving said sieve.

2. In an ash-sifter, the combination, with a sieve-box having one end hinged to the body thereof, a cylindrical sieve located within said box, the bottom of said sieve being pivotally connected with the fast end of said box and the top of said sieve being open, and projections extending beyond the top of said sieve, of a removable top for said sieve, provided with apertures which engage said projections, a hinged door to which said removable top is pivotally connected, and a crank connected to said top, whereby the sieve may be rotated when the top thereof is closed down upon the same.

3. In an ash-sifter, the combination, with the ash-box A, having an opening in its top, of a sieve-box, B, having an open bottom adapted to register with said opening in the top of the ash-box, said sieve-box being hinged to the top of the ash-box at one edge of the opening therein, and one end, $b$, of said sieve-box being hinged to the top of the sieve-box, a cylindrical sieve, C, having a closed bottom and open top, located within said sieve-box, the bottom of said sieve being journaled in the fast end of said sieve-box, projections $c'''$, extending above the open end of said sieve, a cover, C', for said sieve, pivotally connected with the hinged end of said sieve-box, said cover having apertures $c''$, which engage said projections $c'''$ when it is closed down upon the open end of the sieve, and a crank, $c'$, connected with said cover C' for rotating the same.

4. The cylindrical sieve C, closed at its bottom, and the rods $c'''$, secured to said bottom, passing along the sides of said sieve, to which they are secured, and extending slightly above the open top thereof, in combination with the removable top C', having the notches $c''$, adapted to engage the projecting ends of said rods and retained in engagement therewith by a removable end to which said top is pivotally secured.

5. In an ash-sifter, the combination of an ash-box having an open top, a sieve-box having an open bottom and provided with a hinged end and hinged at its opposite end to the ash-box, a sieve having a closed bottom and open top, the closed bottom of said sieve being journaled in the fast end of said box, so that when the sieve-box is turned back the sieve will be raised to a vertical position, and a removable cover for said sieve, substantially as set forth.

6. In an ash-sifter, the combination of an ash-box having an open top, a sieve-box having an open bottom and provided with a hinged end and hinged at its opposite end to the ash-box, a cylindrical sieve having a closed bottom and open top, the closed bottom of said sieve being journaled in the fast end of said box, so that when the sieve-box is turned back the sieve will be raised from a horizontal to a vertical position, a removable cover for said sieve, pivotally connected with the hinged end of the sieve-box, and an ash-pan adapted to fit in the sieve, substantially as set forth.

7. In an ash-sifter, the combination of an ash-box having an open top, a sieve-box having an open bottom and provided with a hinged end and hinged at its opposite end to the ash-box, a cylindrical sieve having a closed bottom and open top, the closed bottom of said sieve being journaled in the fast end of said box, so that when the sieve-box is turned back the sieve will be raised from a horizontal to a vertical position, projections secured to the bottom and extending above the top of said sieve, a cover for said sieve, provided with apertures which engage said projections and journaled in the hinged end of the sieve-box, and an ash-pan adapted to fit in the sieve, substantially as and for the purpose set forth.

In testimony whereof I affix my signature in presence of two witnesses.

JOSEPH E. CROSBY.

Witnesses:
  ADDISON S. CLARK,
  B. H. WOODRUFF.